S. E. RHODES.
POTATO SORTER.
APPLICATION FILED DEC. 14, 1912.
1,135,395.
Patented Apr. 13, 1915.
2 SHEETS—SHEET 1.
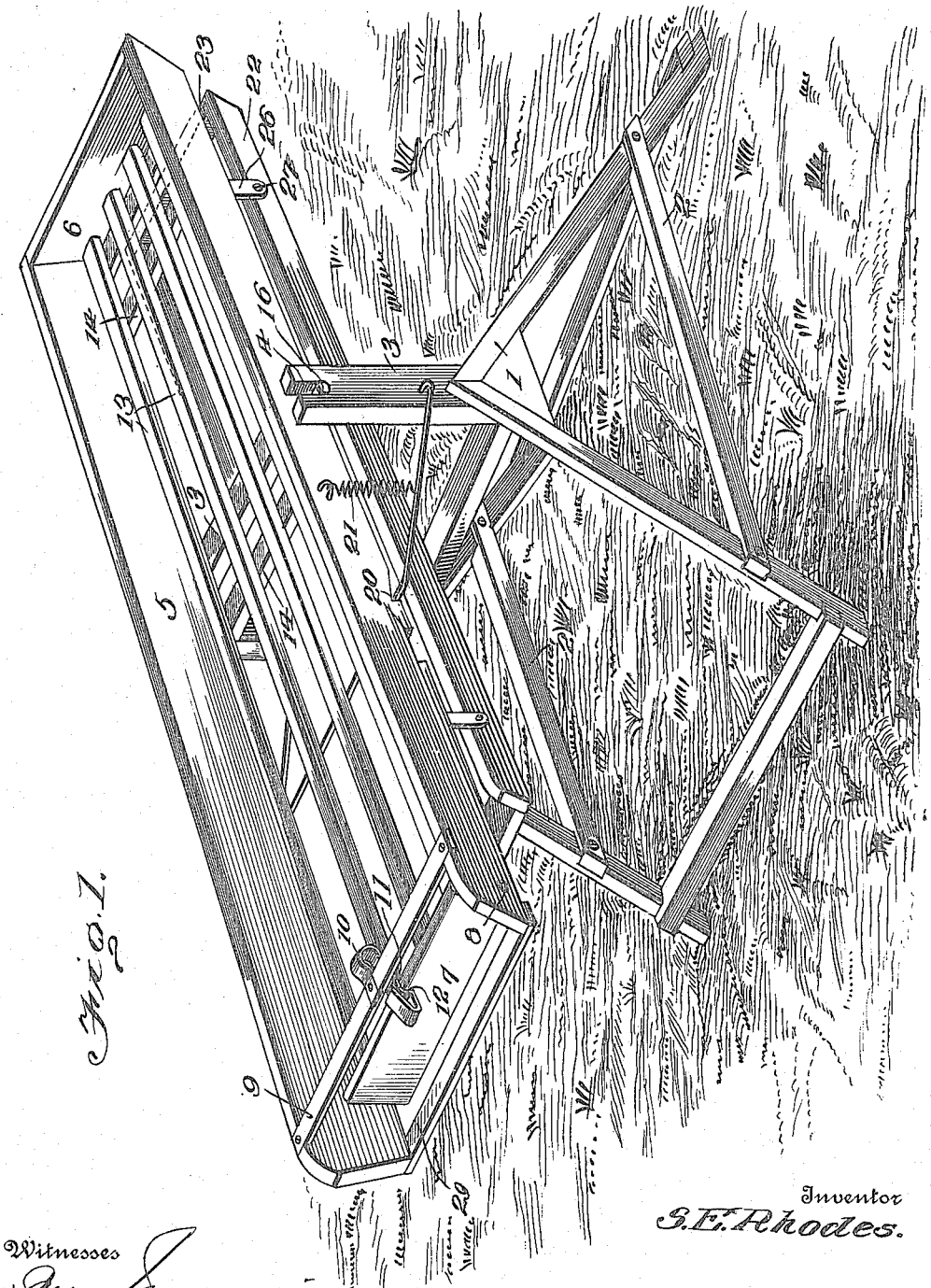

S. E. RHODES.
POTATO SORTER.
APPLICATION FILED DEC. 14, 1912.
1,135,395.
Patented Apr. 13, 1915.
2 SHEETS—SHEET 2.
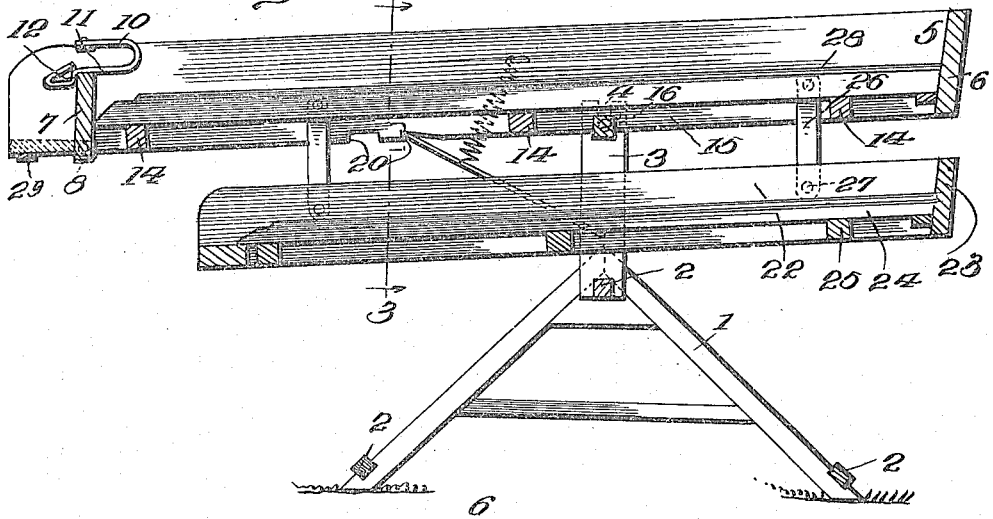
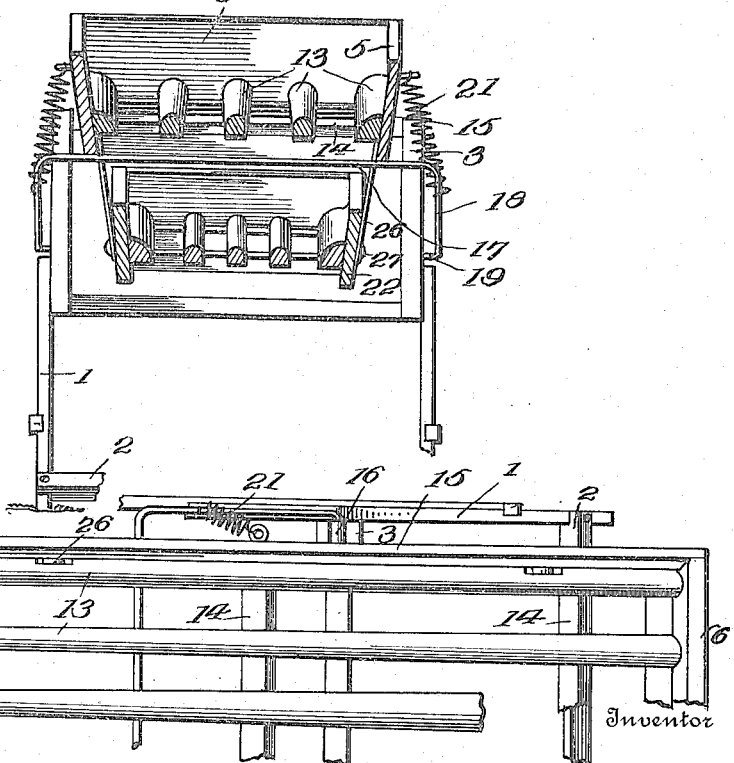
Witnesses 
Inventor
S. E. Rhodes,
By
Attorneys.

UNITED STATES PATENT OFFICE.

SAMUEL E. RHODES, OF GREENVILLE, MICHIGAN.

POTATO-SORTER.

1,135,395.　　　　　Specification of Letters Patent.　　Patented Apr. 13, 1915.

Application filed December 14, 1912. Serial No. 736,806.

*To all whom it may concern:*

Be it known that I, SAMUEL E. RHODES, citizen of the United States, residing at Greenville, in the county of Montcalm and State of Michigan, have invented certain new and useful Improvements in Potato-Sorters, of which the following is a specification.

This invention relates to potato sorters and has as its object to provide a simple device for the purpose stated which may be readily operated to sort potatoes and other vegetables and also fruit, according to size.

It is another object of the invention to so construct the device that it may be successfully employed in sorting long or flat potatoes as well as round ones.

Another object of the invention is to provide a potato sorter in which sorting trays are so arranged and constructed that the better grade of potatoes will be prevented from becoming accidentally mixed with the potatoes of inferior size from which they have been separated.

Another feature of the invention resides in the provision of means for holding the separating trays at the desired angle while the device is in use.

Still further the invention aims to provide a device of this class including an upper separating tray which may be fixedly supported after the potatoes of inferior size have fallen between the slats thereof into another separating tray which is suspended for oscillatory movement below the first mentioned tray, so that after separating the potatoes, and while the upper tray containing the better grade of potatoes remains stationary, the lower tray may be oscillated to separate from the potatoes of inferior size contained therein, bits of leaves, soil and the like.

For a full understanding of the invention reference is to be had to the following description and accompanying drawings, in which:—

Figure 1 is a perspective view of the potato sorter embodying the present invention. Fig. 2 is a vertical longitudinal sectional view therethrough. Fig. 3 is a vertical transverse sectional view on the line 3—3 of Fig. 2, looking in the direction indicated by the arrows. Fig. 4 is a top plan fragmentary view of the potato sorter, the bottom tray being omitted for the sake of clearness.

Corresponding and like parts are referred to in the following description and indicated in all the views of the accompanying drawing by the same reference characters.

In the accompanying drawings, the frame which supports the sorting trays includes side-members 1 which are connected by cross-pieces 2.

Secured to each of the side-members of the frame is an upright 3 provided in its upper end with a notch 4 arranged to receive trunnions at opposite sides of the main sorting tray, as will be presently explained.

The main sorting tray, referred to above, includes inclined sides 5, a rear wall 6, and a gate 7 which is located at its forward or discharge end. The gate 7 is supported at its lower side for swinging movement as indicated at 8 so that it may either assume a vertical position, as shown in Figs. 1 and 2 of the drawings, in which position it closes the forward end of the sorting tray, or may be swung down so as to form a continuation of the bottom of the tray and allow the potatoes contained within the tray to discharge therefrom. A cross-bar 9 is secured at its ends to the upper sides of the side walls 5 of the tray above the gate 7 and a leaf-spring catch 10 is carried by this bar and coöperates with the gate 7 to hold the same in upright position as shown in Fig. 2. This catch, as stated, is in the nature of a leaf-spring and is secured at one end to the bar 9 at a point between the ends of the same and is extended rearwardly and thence bent downwardly and upon itself, as at 11, to extend beneath the bar and beyond its portion 11 is bent to form a head 12, a shoulder of which engages the forward side of the gate 7 when the gate is in upright position. It will be understood at this point that by lifting up the headed end of the leaf-spring catch, the gate will be released for downwardly swinging movement.

The bottom of the sorting tray above mentioned is composed of a number of slats indicated by the numeral 13. These slats are secured upon the upper sides of cleats 14 which extend transversely of the tray and are supported at their ends by the side walls 5. By referring to Fig. 3 of the drawings it will be noted that the slats have transversely convex upper sides and that each slat is tapered from its end which is located at the rear end of the tray, continuously to its end which is located at the forward or discharge end of the tray so that there is less space between the slats at the rear end of the tray than at the discharge end. Where the potatoes to be sorted, while of different size, are round as distinguished from those which are long or more or less flat, the ordinary or parallel arrangement of the slats in such a tray, as above described, would probably prove satisfactory, but where the potatoes are flat or of irregular form, they cannot be satisfactorily graded by the use of the ordinary slat arrangement. But I have found that by tapering the slats as herein shown and described, so that the space between any two slats will gradually increase from end to end of the slats the flat potatoes will be gradually turned, as the tray is agitated so as to pass edgewise between the slats, provided of course that they are of inferior size. Extending transversely beneath the tray and secured at its ends to the lower edges of the side walls 5 is a side-bar 15 provided at its ends with trunnions 16 which fit within the notches 4 in the upper ends of the uprights 3. It will be observed from an inspection of Fig. 2 that the side-bar 15 carrying the trunnions 16 is located rearwardly of the middle of the tray so that while the tray is supported for oscillatory movement, it has a tendency toward downward tilting of its forward or discharge end. In order, however, that the tray may be supported against such tilting movement and at various angles of inclination, means is provided which will now be described.

The supporting means above mentioned, includes a brace-member which is preferably formed from a length of rod material bent at spaced points to form a connecting portion 17 and arms 18 which extend substantially at right angles therefrom and are pivotally engaged at their ends as at 19 in openings formed in the uprights 3, the brace-member being in this manner supported for swinging movement on the said upright. The side-walls 5 of the trays are formed in their under edges with notches 20 and it will be apparent from the drawings that the connecting portion 17 of the brace member is engageable interchangeably in these notches and that by reason of such engagement the angle of inclination of the tray may be varied and the tray may be supported in fixed position after being adjusted to the desired angle of inclination. In order to support the bracing member in position for engagement in the notches in the under edges of the side walls of the tray, springs 21 are connected at their upper ends to the side walls 5 and at the lower ends to the arm 18 of the brace-member and yieldably support the brace-member in the manner stated.

In addition to the tray above described, there is provided a secondary sorting tray which is supported for oscillatory movement beneath the main tray. This secondary tray includes side walls 22, a rear-end wall 23 and a slat bottom 24, the slats comprising the bototom being arranged and secured upon transversely extended cleats 25 supported at their ends by the side walls 22. The secondary tray is supported by means of links 26 which are pivoted at their lower ends as at 27 to the side-walls 22 and at their upper ends as at 28, to the side-walls 5 of the main sorting tray. A bar 29 is secured to the under edges of the side-walls 5 of the main sorting tray at the discharge end of the tray and is arranged to support the gate when the latter is in lowered position.

From the foregoing description of the invention it will be seen that the main sorting tray may be adjusted to assume positions at various angles of inclination and may be held stationary at any of its positions of adjustment. It will also be apparent that while the main sorting tray is stationary the lower tray may be oscillated so as to separate from the potatoes of inferior size which have been discharged thereinto from the main sorting tray, bits of grass, leaves, soil, etc.

It will also be understood, that while the main sorting tray is being oscillated to cause the potatoes therein to roll back and forth over the flat bottom, the lower or secondary tray will also be oscillated, inasmuch as it is loosely supported from the main tray by the links 26. It is further to be noted that the secondary sorting tray is of less length than the main tray and terminates at its forward end at a point rearwardly of the forward end of the main tray so that potatoes contained within the main sorting tray may be removed therefrom without likelihood of the potatoes of inferior size becoming accidentally mixed therewith.

Having thus described the invention what is claimed as new is:—

In a device of the class described, a support, a sorting tray mounted for oscillatory movement upon the support, the axis of oscillation of the tray being located rearwardly of the transverse middle thereof, whereby the tray will be normally overbalanced, a supporting frame including side members pivotally mounted upon the support and a connecting portion extending between the side members, the tray being provided with a series of seats selectively engageable by the said connecting portion of the frame, and a spring connected to the said sorting tray and to one of the side members of the frame and yieldably supporting the said frame in position to engage in the said seats.

In testimony whereof I affix my signature in presence of two witnesses.

SAMUEL E. RHODES. [L. S.]

Witnesses:
WILLIAM FINCH,
JONES A. KELLOGG.

Copies of this patent may be obtained for five cents each, by addressing the "Commissioner of Patents, Washington, D. C."